(12) United States Patent
Alper et al.

(10) Patent No.: US 6,491,776 B2
(45) Date of Patent: Dec. 10, 2002

(54) DUAL ADHESIVE APPLICATION FOR LAMINATING ELASTIC WEBS

(75) Inventors: Mark Alper, Mukwonago, WI (US); Russell P. Stuczynski, South Milwaukee, WI (US)

(73) Assignee: Bostik Findley, Inc., Wauwatosa, WI (US)

(*) Notice: Subject to any disclaimer, the term of this patent is extended or adjusted under 35 U.S.C. 154(b) by 46 days.

(21) Appl. No.: 09/840,371

(22) Filed: Apr. 23, 2001

(65) Prior Publication Data

US 2002/0153086 A1 Oct. 24, 2002

(51) Int. Cl.[7] .................. B32B 31/08; A61F 13/15
(52) U.S. Cl. .............. 156/161; 156/163; 156/164; 156/229; 156/310; 156/314
(58) Field of Search ................. 156/161, 163, 156/164, 229, 310, 314

(56) References Cited

U.S. PATENT DOCUMENTS

| | | | |
|---|---|---|---|
| 4,634,482 A | * 1/1987 | Lammers | 156/164 |
| 4,842,666 A | 6/1989 | Werenicz | 156/161 |
| 5,681,645 A | 10/1997 | Strack et al. | |
| 6,010,972 A | * 1/2000 | Zacharias et al. | 428/304.4 |
| 6,057,024 A | 5/2000 | Mleziva et al. | |

FOREIGN PATENT DOCUMENTS

| | | |
|---|---|---|
| WO | WO 80/00676 | 4/1980 |
| WO | WO-87/04117 A1 * | 7/1987 |
| WO | WO 00/20202 | 4/2000 |
| WO | WO 01/81689 | 11/2001 |

* cited by examiner

Primary Examiner—Jeff H. Aftergut
(74) Attorney, Agent, or Firm—Andrus, Sceales, Starke & Sewall, LLP

(57) ABSTRACT

The present invention provides a method of making a laminated, gathered, elastic web. The method includes the steps of feeding a first substrate in a machine direction, feeding a second substrate aligned with the first substrate in the machine direction, and feeding an array of elastomeric strand material between the first and second substrates in such a manner that the elastomeric strand material is stretched in the machine direction and aligned with the first and second substrates. A hot melt pressure sensitive adhesive, such as a styrene-isoprene-styrene based adhesive, is applied to one substrate, and a curable adhesive, such as a polyurethane based adhesive, is applied to the other substrate. Thereafter, the two substrates and the elastomeric strand material are compressed to form a laminate elastic web while maintaining the elastomeric strand material in its stretched state. Machine direction tension is maintained on the laminate until the hot melt adhesive cools and bonds the layers together. Thereafter, the machine direction tension is released to permit the elastic web to contract to form a gathered elastic web.

17 Claims, 3 Drawing Sheets

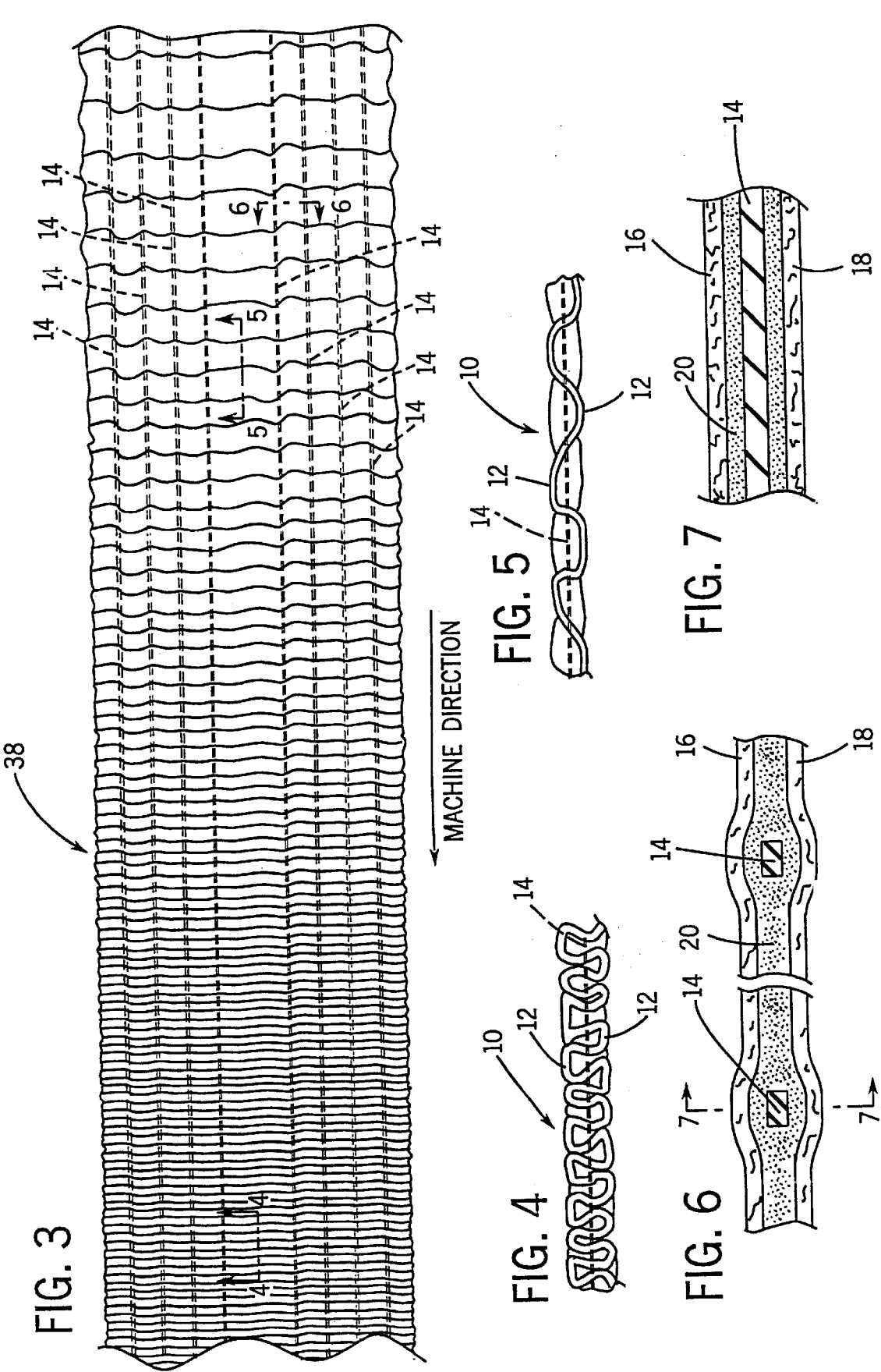

DUAL ADHESIVE APPLICATION FOR LAMINATING ELASTIC WEBS

FIELD OF THE INVENTION

This invention relates to a method of fabricating laminated elastic webs that are useful as elasticized structures, and more specifically, useful in outdoor applications such as window flashing.

BACKGROUND OF THE INVENTION

Many disposable or non-disposable articles have laminated elastic components forming one or more expandable or stretchable portions in the article. For example, some of these types of articles include sweat bands, bandages, and laminated elastic waistbands in disposable diapers. Typically, the laminated elastic component of a disposable diaper is comprised of two layers of nonwoven fabric having elastomeric strands adhered therebetween. The elastomeric strands are laminated to the nonwoven layers in a pre-stretched condition. When the elastomeric strands relax, the nonwoven material gathers. The machines and tooling required for integral fabrication of laminated elastic articles are extremely complex.

Typically, the elastomeric strands and substrates are joined together by adhesives, such as hot melt pressure sensitive adhesives. Hot melt adhesives typically exist as a solid mass at ambient temperature and can be converted to flowable liquid state by the application of heat. In these applications, the hot melt adhesive is heated to the molten state and then applied to a substrate. A second substrate is then immediately laminated to the first and the adhesive solidifies on cooling to form a strong bond. The major advantage of hot melt adhesives is the lack of a liquid carrier, as would be the case for water-based or solvent based adhesives, thereby eliminating the costly drying step during application. Also, hot melt adhesives can be formulated to have relatively short open times, and thus do not require any curing and/or crosslinking. Thus, hot melt adhesives typically have high "green" strength upon application. Suitable hot melt adhesives must possess the appropriate bond strength to adhere the substrates involved, and must also possess adequate flexibility, staining or bleedthrough resistance, suitable viscosity and open time to function on commercial equipment, acceptable stability under storage conditions, and acceptable thermal stability under normal application temperature.

Many different polymers have been used in hot melt adhesives employed in the construction of laminates. In this regard, typical hot melt adhesives have employed polymers which have included styrene-isoprene-styrene (SIS); styrene-butadiene-styrene (SBS); styrene-ethylene-butylene-styrene (SEBS); ethylene-vinyl acetate (EVA); and amorphous poly-alpha-olefm (APAO). While these polymers, when properly blended, provide acceptable adhesion between most substrates employed in typical disposable goods construction such as diapers or packaging materials, they have several shortcomings which have detracted from their usefulness m connection with outdoor applications such as window flashing.

One of the most noteworthy shortcomings of hot melt adhesives concerns their durability. Typical hot melt adhesives do not perform well under conditions involving large temperature extremes such as outdoor applications where summer and winter temperatures can vary dramatically. Also, the long term aging, i.e. UV stability, of hot melt adhesives is also a concern with outdoor applications which are exposed to sunlight. Thus, it would seem logical to use an adhesive that provides long term strength, is UV stable and can perform well under wide temperature variances to bond a laminate structure together for use in outdoor applications. However, in order to obtain such characteristics, one must look toward curable or crosslinkable adhesives such as polyurethane based adhesives. Unfortunately, due to the need for curing and/or crosslinking, and thus the, time involved for curing and/or crosslinking, such adhesives have low "green" strength and would thus have inadequate bonding capabilities upon initial application. As a result, the use of curable or crosslinkable adhesives such as polyurethane in elasticized laminated webs is not practical since the web would fall apart after fabrication.

SUMMARY OF THE INVENTION

The present invention provides a method of making a laminated, gathered, elastic web. The method includes the steps of feeding a first substrate in a machine direction, feeding a second substrate aligned with the first substrate in the machine direction, and feeding an array of elastomeric strand material. between the first and second substrates in such a manner that the elastomeric strand material is stretched in the machine direction and aligned with the first and second substrates. A hot melt pressure sensitive adhesive, such as a styrene-isoprene-styrene based adhesive, is applied onto the elastomeric strand material, and a curable adhesive, such as a polyurethane based adhesive, is applied to one of the substrates. Thereafter, the two substrates and the elastomeric strand material are compressed to form a laminate elastic web while maintaining the elastomeric strand material in its stretched state. Machine direction tension is maintained on the laminate until the hot melt adhesive cools and bonds the layers together. Thereafter, the machine direction tension is released to permit the elastic web to contract to form a gathered elastic web.

The pressure sensitive hot melt adhesive is a thermoplastic adhesive that provides the green strength necessary to initially bond the laminated elastic web together while the curable adhesive provides long term strength for the structure over a range of temperature extremes, as well as excellent ultraviolet light stability which is desirable for outdoor applications such as window flashing. The pressure sensitive hot melt adhesive is a hot melt adhesive having sufficient strength to initially bond the elastic strands in place. One preferred example would be a hot melt adhesive used in bonding elastic strands in disposable articles, such as diapers. The curable adhesive may be any one of a variety of single component or dual component adhesives. The curable adhesive is preferably applied using hot melt application equipment. For example, if a single component system, the adhesive may be heat curable or moisture curable, but is preferably moisture curable polyurethane based. If a two component system, the curable adhesive may also be urethane based or may be epoxy based.

The substrates are preferably comprised of a spun-bonded high density polyethylene web and a low density polyethylene film. The pressure sensitive hot melt adhesive is applied at an add-on level of from about 2 to about 20 grams per square meter, but preferably about 15 grams per square meter. Likewise, the curable adhesive is applied at an add-on level of about 2 to about 20 grams per square meter, but preferably at a level of about 6 grams per square meter.

The method of the present invention thus overcomes the disadvantages of each individual adhesive, and provides a method for making a laminated, gathered, elastic web specifically adapted for outdoor applications. Various other features, objects and advantages of the invention will be apparent to those skilled in the art upon reviewing the following drawings and description thereof.

BRIEF DESCRIPTION OF THE DRAWINGS

The drawings illustrate the best mode presently contemplated of carrying out the invention.

In the drawings:

FIG. 3 is a top view of the laminated elastic web shown in FIG. 1, illustrating various degrees of stretching of the laminated elastic web as the elastic in the web relaxes;

FIG. 4 is a partial section view taken along line 4—4 of FIG. 3 illustrating the laminated elastic web in a relatively gathered condition;

FIG. 5 is a partial section view taken along line 5—5 of FIG. 3 illustrating the laminated elastic web in a stretched condition;

FIG. 6 is a partial section view taken along line 6—6 in FIG. 3 which illustrates and exaggerates the adhesive bond between the two substrate layers and elastic strands extending therethrough; and FIG. 7 is a partial section view taken along line 7—7 of FIG. 6 further illustrating the elastic strand retained between the two substrate layers.

DETAILED DESCRIPTION OF THE INVENTION

Figure 1:
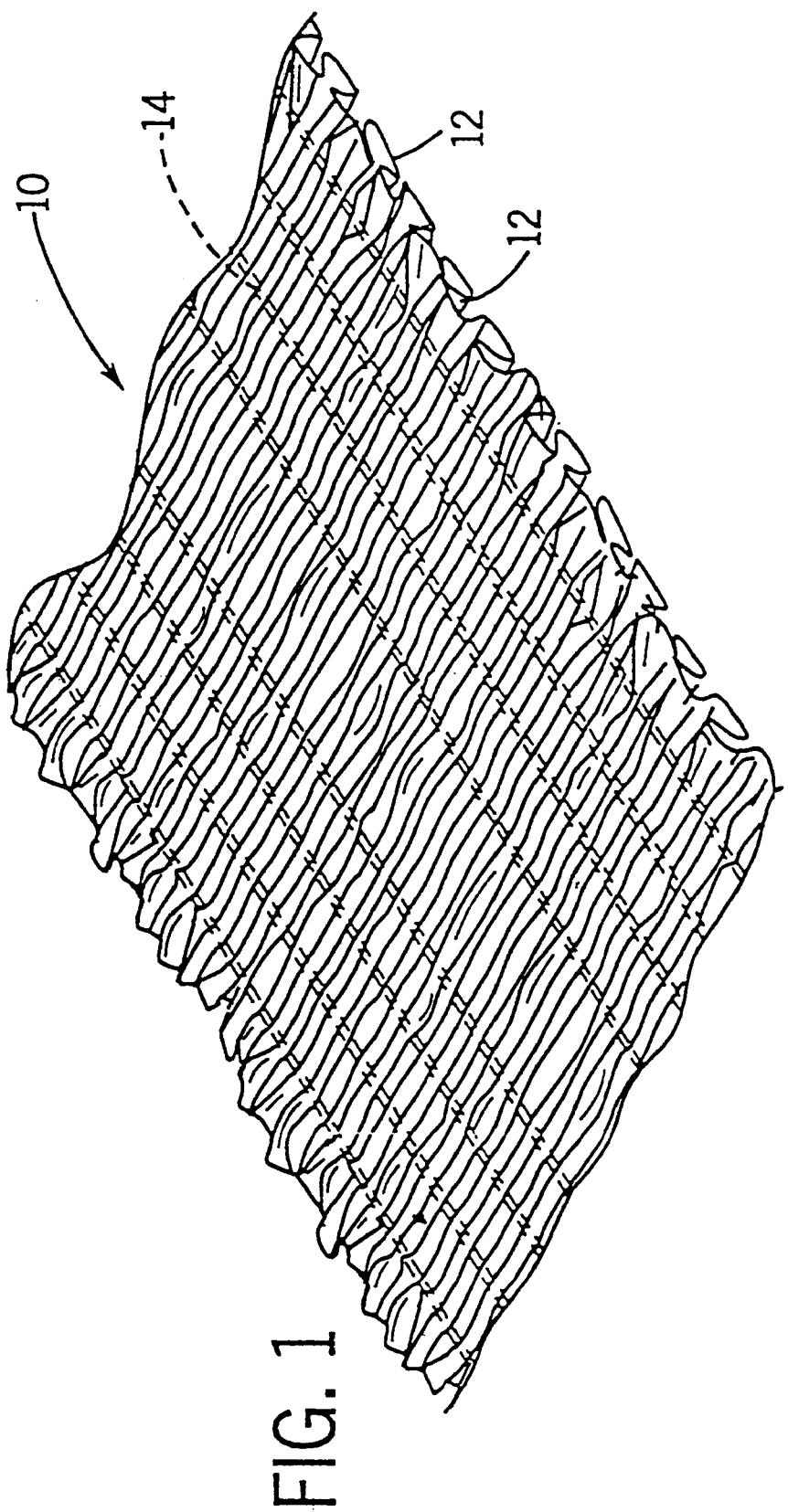
FIG. 1 is a perspective view of a gathered, laminated elastic web which is made in accordance with the present invention.

FIG. 1 illustrates a strip of a gathered, laminated elastic web 10 constructed in accordance with the invention. Although only a portion of the laminated elastic web 10 is shown in FIG. 1, it should be understood that the laminated elastic web 10 has a continuous length that is later cut to a desired length by the end user. In its preferred embodiment, the laminated elastic web 10 is approximately 8 inches wide although the width of the laminated elastic web 10 can vary depending on the application. In the preferred embodiment of the invention, the laminated elastic web 10 includes 46 individual elastomeric strands 14 extending longitudinally in the machine direction along the continuous length of the web 10. It should be understood that a larger or smaller number of elastomeric strands 14 can be used in accordance with the invention, depending upon the particular end use for the laminated elastic web 10. In the preferred embodiment, the elastomeric strands 14 are individual strands of Lycra® XA, a segmented polyurethane commercially available from DuPont. It is contemplated that other types of elastic materials could be substituted for the elastomeric strands 14, such as various elastic films, threads or adhesives, as long as they provide the desired elasticity to the web 10.

Referring now in particular to FIG. 6, the laminated elastic web 10 preferably includes a first substrate or layer 16 and a second substrate or layer 18. It should be pointed out that the invention is not limited to laminates having two layers. The fabrication technique disclosed herein can be, used for laminated elastic webs having more than two layers, or even for a laminated elastic web having a single layer. In the preferred configuration shown in FIG. 6, the first layer 16 and the second layer 18 captures and sandwiches the elastic strands 14 therebetween. In some cases, the first layer 16 and the second layer 18 can be similar types of materials, and in other cases they may be dissimilar types of materials, depending on the desired end use of web 10. As a specific example, the preferred composition of first layer 16 is a spun-bonded, high density polyethylene web material available from DuPont under the brand name Tyvek®. The second layer 18 is preferably a linear low density polyethylene film material available from a number of suppliers, such as Clopay, Inc., but may also be composed of any of numerous other polyolefin films.

Referring to FIGS. 6 and 7, the elastomeric strands 14 are retained between the first layer 16 and the second layer 18 by an adhesive layer 20. The elastomeric strands 14 are adhered both to the first layer 16 and the second layer 18. Suitable adhesives comprising layer 20 have the proper adhesive properties to prevent the elastomeric strands 14 from slipping between the layers 16 and 18. Additionally, the selected adhesive layer 20 should provide an adequate bond to adhere the first layer 16 to the second layer 18. In the preferred embodiment of the invention, the adhesive layer 20 is actually composed of two different adhesives, namely, a pressure-sensitive, hot-melt adhesive, such as a styrene-isoprene-styrene (SIS) based adhesive Product No. H2385, available from Bostik Findley, Inc., the assignee of the present invention, and a curable adhesive, such as moisture cure polyurethane based adhesive Product No. XPU 18228, also available from Bostik Findley, Inc.

Figure 2:
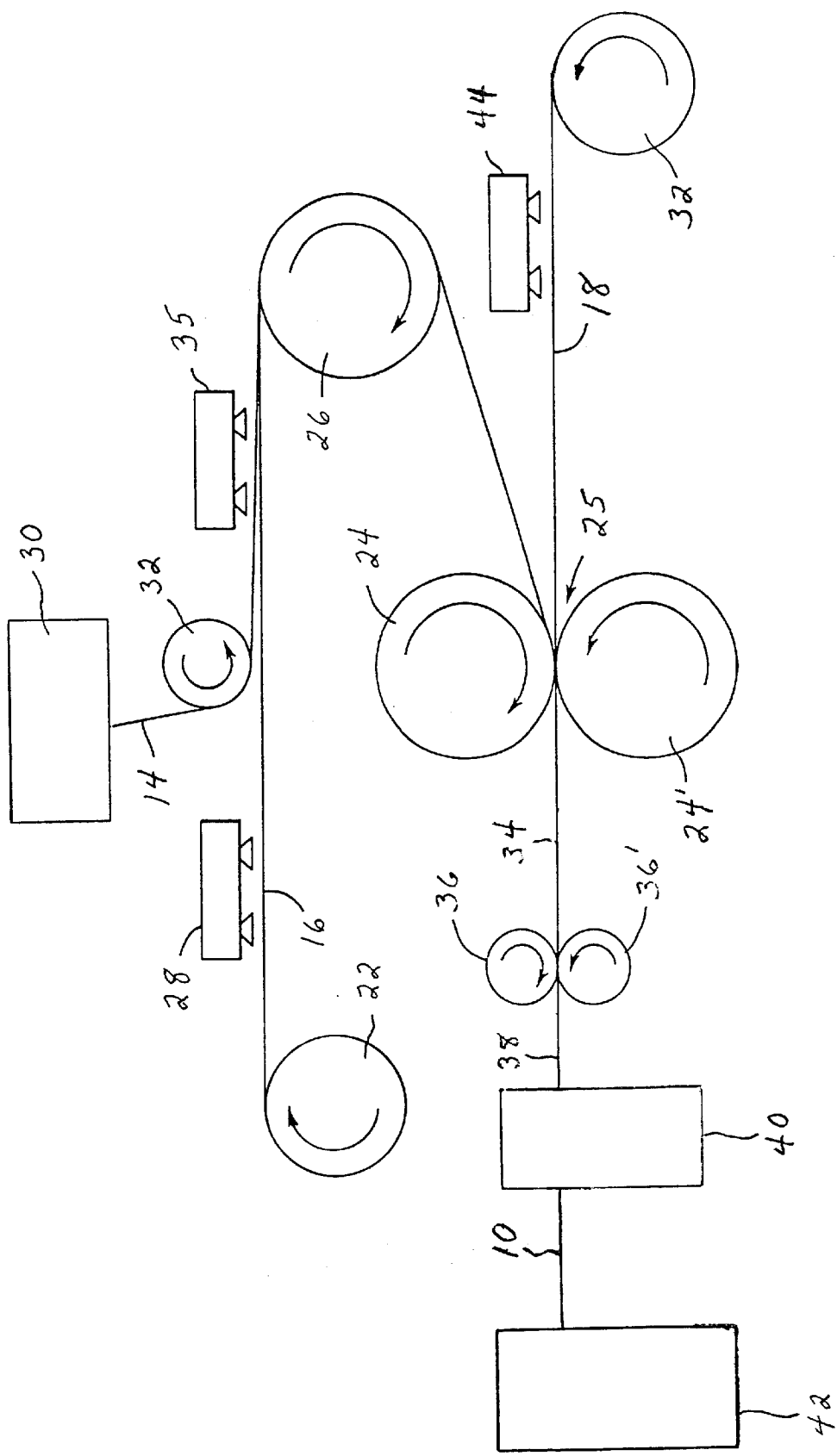
FIG. 2 is a general schematic diagram illustrating the apparatus used in making the gathered laminated elastic web shown in FIG. 1.

The laminate 10 of the current invention can be manufactured by joining 20 together the first and second layers 16, 18 and the array of elastomeric strand material 14 using a high speed (e.g. 300–600 fpm), lamination machine, as schematically shown in FIG. 2. The term "array" refers to the arrangement or pattern of strands 14 being bonded between substrates 16, 18. In the current laminate web 10, strands 14 are fed parallel and spaced from one another in a single plane. Those skilled in this art will recognize that different arrays could be used. It is also to be understood that FIG. 2 illustrates the array of strands 14 as a single line only as a matter of convenience, and thus this line in FIG. 2 represents the entire array of strands 14. First sheet layer 16 is delivered from supply roll 22 and fed at a predetermined speed towards adhesive applicator 28 and around roll 26 to nip 25 formed by nip rolls 24 and 24'. An array of elastomeric strands 14 is aligned in the machine direction and is under machine direction tension in a stretched state, preferably between about 150% to 350% of their relaxed length, and most preferably between about 200%–300% elongation, during the lamination process. The elastomeric strands should be stretched sufficiently to gather the first and second layers 16, 18 but not stretched so much that the elastomeric strands 14 break and cause process interruptions.

The array of elastomeric strands 14 is fed to nip 25 from an elastomeric strand unwind station 30. The elastomeric strand unwind station 30 includes a plurality of spools (not shown) for dispensing the individual elastomeric strands 14. The elastomeric strands 14 are pulled from the spools within station 30, and are pre-stretched to at least 150% of their relaxed length. In the preferred embodiment of the invention, the elastomeric strands 14 are pre-stretched to approximately 280% of their relaxed length.

Once pre-stretched, the elastomeric strands 14 are fed around roll 26 and into nip 25. The laminating machine operates at a line speed, which is about 300 feet/minute, but can be adjusted depending on conditions. The second sheet layer 18 is delivered from supply roll 32, aligned with layer 16 and strands 14, and fed into the nip 25 of the machine at the same line speed as layer 16 and strands 14. Preferably, the first and second layers 16, 18 are webs of material having a width of approximately 8 inches. The webs may eventually be sliced in the laminating machine to form any number of laminated webs each having a desired width.

A curable adhesive, such as a moisture curable adhesive, is applied, continuously onto layer 16 using adhesive applicator 28. Optionally, a curable adhesive may also be applied onto layer 18 using applicator 44. Examples of suitable applicators are spray and slot coaters, preferably a slot coater.

An adhesive, such as a pressure sensitive hot melt adhesive, is applied continuously onto strands 14 using adhesive applicator 35. Examples of suitable adhesive applicators are spray and slot coaters. The hot melt adhesive can be held in a molten state in a hot reservoir and pumped therefrom through nozzles or die orifices, respectively, and applied to strands 14. In the embodiment shown in FIG. 1, the adhesive is meltblown sprayed onto the array of elastomeric strands 14. In a preferred embodiment where the first layer is a spun-bonded high density polyethylene web and the second layer is a linear low density polyethylene film, the adhesive is preferably applied to the side of strands 14 that face the low density polyethylene sheet. Also it is preferred that the curable adhesive be applied to layer 16 first, and thereafter followed by application of the hot melt onto strands 14.

The first sheet layer 16 and the array of elastomeric strands are brought into contact with second layer 18, which is delivered from supply roll 32 towards roll nip 25 formed by counter-rotating nip rolls 24 and 24'. The first and second layers 16, 18 are forced (by compression) into direct contact with the stretched elastomeric array of strands 14, hot melt adhesive and curable adhesive in the roll nip 25 to form tensioned laminate 34 with the stretched elastomeric strands 14 sandwiched between the first and second sheet layers 16, 18. Tension is maintained on the laminate 34 until it passes tensioning rolls 36, 36'. The tensioned or stretched laminate is schematically illustrated in FIG. 5 This allows the hot melt adhesive to cool and bond the layers 16, 18 together before the machine direction tension is released. The machine direction tension is released after rolls 36, 36' and the elastomeric strands 14 retract and cause a reduction in length of the laminate due to the gathering of the layers in an accordion fashion to form a gathered laminate 10. This retraction process is schematically illustrated in FIG. 3. The gathered laminate 10 is fed to a collection chamber, such as J-box 40, which acts as an accumulator and forms another differential in speed between the gathered laminate entering the collection chamber and the laminate exiting the chamber such that the laminate 10 exits at a speed that is lower than the entrance speed. In order to allow the laminate to further relax, it can be collected in a festooning station 42 where the laminate 10 is directed in a back and forth motion to form layers in a box. The gathered web or laminate is schematically illustrated in FIG. 4 in cross section.

It is important, when the tension on the elastomeric strands 14 is released, that the hot melt adhesive has formed a strong adhesive bond between the first and second layers 16, 18 and the elastomeric array of strands 14. Thus, it is important that the hot melt adhesive has high initial tack to quickly provide a strong bond between the strands 14 and the layers 16, 18. Preferably, it is also desirable that the adhesive have good elevated temperature creep resistance to adequately bond the strands in place. Preferred examples includes thermoplastic hot melt pressure sensitive adhesive having a polymer selected from the group consisting of styrene-iosprene-styrene (SIS); styrene-butadene-styrene (SBS); styrene-ethylene-butylene-styrene (SEBS); ethylene-vinyl acetate (EVA); amorphous poly-alpha-olefin, (APAO); and ethylene-styrene interpolymer (ESI). Most preferred are adhesives based on styrene-isoprene-styrene (SIS) block copolymers. The preferred hot melt pressure sensitive adhesive is an SIS based product available under Product No. H2385 from Bostik Findley, Inc.

The hot melt adhesive is preferably selected such that it provides good bond strength between the layers and also has good ultraviolet and thermal stability. A combination of hot melt adhesive compositions can be used by feeding to separate orifices from different reservoirs. For example, a first hot melt adhesive which provides high initial tack such as styrene-isoprene-styrene hot melt adhesives like those known in the art for use in diaper manufacture can be applied, followed by another hot melt adhesive supplied from a separate orifice, which provides other desirable attributes such as increased flexibility which might also be desirable for outdoor applications such as flashing.

In addition to the hot melt pressure sensitive adhesive referred to above, the process of the present invention utilizes a curable adhesive to provide long term strength and durability to lamination 10. In applications such as window flashing, the lamination 10 will be subjected to a wide range of temperature extremes due to summer and winter temperatures as well as sunlight which requires the lamination to have excellent long term aging, i.e. UV stability, characteristics. As noted above, although the hot melt pressure sensitive adhesive provides excellent "green" strength to hold the lamination together initially during fabrication, such hot melt adhesives do not provide adequate long term strength, temperature resistance and durability. Accordingly, curable adhesives, such as single component adhesives that are heat curable, ultra-violet light curable (UV curable), or moisture curable, or dual component adhesives that are crosslinkable may be used. The preferred curable adhesive is polyurethane based, and most preferably is an aliphatic moisture cure polyurethane available under the designation XPU18228 from Bostik Findley, Inc. Other examples include two component polyurethane and two component epoxy adhesives. When a moisture curable adhesive is used, at least one of the substrates should be moisture permeable. The curable adhesive is applied directly to layer 16 using slot applicator 28 and/or to layer 18 of the laminate using slot applicator 40. The hot melt pressure sensitive adhesive is then melt blown sprayed onto the elastic strands 14 which are situated about 1 inch over substrate 18 prior to entering nip 25. The curable adhesive may be applied in a range of add on levels of about 2 to about 20 grams per square meter, but preferably is applied at an add on level of about 6 grams per square meter. Likewise, the pressure sensitive hot melt adhesive may be applied in a range of add on levels of about 2 to about 20 grams per square meter, but is preferably melt blown sprayed onto strands 14 at an add on level of about 15 grams per square meter. The preferred hot melt pressure sensitive adhesive is an SIS based product available under Product No. H2385 from Bostik Findley, Inc.

EXAMPLE ONE

This example demonstrates formation of a gathered laminate comprising a first layer of an embossed and creped flash-spun non-woven high density polyethylene, a second layer comprising a linear low density polyethylene film, and an array of spandex yarns sandwiched between the two layers with the layers being bonded using a combination of two adhesives, one a thermoplastic hot melt and the other a moisture curable polyurethane adhesive. The apparatus and process described above (FIG. 1) was used in this example.

The layers were laminated at a lamination speed of 300 ft/min with an array of 48 strands Lycra® XA spandex (available from E.I. duPont de Nemours & Co., Wilmington, Del.) having a linear density of 620 decitex per filament (available from E.I. du Pont de Nemours & Co., Wilmington, Del.). The embossed side of the first layer was adjacent the spandex array. The individual spandex strands were equally spaced with a spacing between the outermost strands of 7.625 inches (19.4 cm). The Lycra® XA spandex array was tensioned to an elongation of 280% during the lamination. H-2385 styrene-isoprene-styrene hot melt adhesive from Bostik Findley, Inc. was applied directly onto sheet 16 using a DF2 spray head from J&M Laboratories (Dawsonville, Ga.) with an air temperature of 390° F. and air pressure of 10 psi in the metering head, and XPU 18288 polyurethane curable adhesive, also from Bostik Findley, Inc. which was applied using a slot die applicator directly onto sheet 18 having a width of 8.5 inches (21.6 cm). The styrene-isoprene-styrene (H-2385) hot melt adhesive was held in a tank at 380° F. and applied at an add-on of 15 g/m$^2$ and the polyurethane adhesive was held in a tank at 250° F. and applied at an add-on of 6 g/m$^2$. The open time (time between the point at which the hot melt is sprayed onto the sheet 16 and the point at which the Tyvek® sheet, Lycra® AX spandex, hot melt, polyurethane and polyethylene film meet in the nip rolls) was 0.43 seconds (corresponding to a distance of 13 inches (33 cm). The nip roll pressure was set at 40 psi. A slitter was located at the end of the process having a width of 8 inches (20.3 cm).

We claim:

1. A method of making a laminated, gathered, elastic web, comprising the steps of:

feeding a first substrate in a machine direction;

feeding a second substrate aligned with said first substrate in said machine direction;

feeding an array of elastomeric strand material between said first and second substrates, said elastomeric strand material being stretched in said machine direction and aligned with said first and second substrates;

applying a curable adhesive continuously to one of said substrates;

applying a thermoplastic hot melt pressure sensitive adhesive continuously to one of said substrates;

compressing said substrates and elastomeric strand material together to form a laminated elastic web while maintaining said elastomeric strand material in its stretched state; and releasing machine direction tension on said elastomeric strand material to permit said laminate elastic web to contract to form a gathered elastic web.

2. The method of claim 1 wherein said hot melt pressure sensitive adhesive includes a polymer selected from the group consisting of styrene-isoprene-styrene (SIS); styrene-butadiene-styrene (SBS); styrene-ethylene-butylene-styrene (SEBS); ethylene-vinyl acetate (EVA); amorphous poly-alpha-olefin (APAO); and ethylene-styrene interpolymer (ESI).

3. The method of claim 1 wherein said hot melt pressure sensitive adhesive is a styrene-isoprene-styrene based adhesive.

4. The method of claim 1 wherein said curable adhesive is selected from the group consisting of single-component and dual-component curable adhesives.

5. The method of claim 1 wherein said curable adhesive is a polyurethane-based adhesive.

6. The method of claim 1 wherein said first substrate is a high density polyethylene sheet.

7. The method of claim 1 wherein said second substrate is a polyolefin film.

8. The method of claim 1 wherein said second substrate is a low density polyethylene film.

9. The method of claim 1 wherein said pressure sensitive hot melt adhesive is applied at an add-on level of from about 2 to about 20 grams per square meter.

10. The method of claim 1 wherein said pressure sensitive hot melt adhesive is applied at an add-on level of about 15 grams per square meter.

11. The method of claim 1 wherein said curable adhesive is applied at an add-on level of about 2 to about 20 grams per square meter.

12. The method of claim 1 wherein said curable adhesive is applied at an add-on level of about 6 grams per square meter.

13. The method of claim 4 wherein said curable adhesive is selected from the group consisting of heat curable, ultra-violet light curable and moisture curable single component adhesives.

14. The method of claim 12 wherein said curable adhesive is a moisture curable polyurethane.

15. The method of claim 1 wherein said curable adhesive and said thermoplastic hot melt pressure sensitive adhesive are both applied to the same substrate.

16. The method of claim 1 wherein said curable adhesive and said thermoplastic hot melt pressure sensitive adhesive are applied to different substrates.

17. The method of claim 1 wherein said curable adhesive is applied to said first substrate, and said thermoplastic hot melt pressure sensitive adhesive is applied simultaneously to said elastomeric strand material and said second substrate.

* * * * *